(12) United States Patent
Kim et al.

(10) Patent No.: US 10,127,430 B2
(45) Date of Patent: Nov. 13, 2018

(54) FINGERPRINT RECOGNITION SENSOR

(71) Applicant: SILICON DISPLAY TECHNOLOGY, Yongin-si (KR)

(72) Inventors: Jaemin Kim, Gyeongsan-si (KR); Kijoong Kim, Suwon-si (KR); Jin Hyeong Yu, Dangjin-si (KR); Young Man Park, Gwangju-si (KR); Yeon Hwa Kim, Yongin-si (KR); Ji Ho Hur, Yongin-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 68 days.

(21) Appl. No.: 15/392,073

(22) Filed: Dec. 28, 2016

(65) Prior Publication Data

US 2017/0351901 A1    Dec. 7, 2017

(30) Foreign Application Priority Data

Jun. 7, 2016  (KR) .......................... 10-2016-0070289

(51) Int. Cl.
*G06K 9/00* (2006.01)

(52) U.S. Cl.
CPC ....... *G06K 9/00087* (2013.01); *G06K 9/0002* (2013.01); *G06K 9/00013* (2013.01); *G06K 9/00046* (2013.01); *G06K 9/00053* (2013.01)

(58) Field of Classification Search
CPC ............. G06K 9/0002; G06K 9/00013; G06K 9/0004; G06K 9/00046; G06K 9/00006
See application file for complete search history.

(56) References Cited

U.S. PATENT DOCUMENTS

| 8,144,271 | B2* | 3/2012 | Han | ................. | G06F 3/0425 345/175 |
| 9,245,167 | B2* | 1/2016 | Carver | ................. | G06K 9/0004 |
| 2004/0252867 | A1* | 12/2004 | Lan | ................. | G06K 9/0004 382/124 |
| 2013/0092838 | A1* | 4/2013 | Weber | ................. | G01J 1/0407 250/353 |

(Continued)

FOREIGN PATENT DOCUMENTS

| KR | 10-2005-0000455 | 1/2005 |
| KR | 10-0928301 | 11/2009 |

(Continued)

*Primary Examiner* — Utpal D Shah
(74) *Attorney, Agent, or Firm* — Lex IP Meister, PLLC

(57) ABSTRACT

Disclosed is a fingerprint recognition sensor including: a backlight unit including a base layer positioned on one surface of a substrate and including a transparent material and a light source irradiating light to the inside of the base layer on one side of the base layer, in which light in which an incident angle on a surface facing the substrate is larger than a critical angle is transmitted toward the substrate; a cover layer spaced apart from the substrate and facing the other surface of the substrate; multiple sensor pixels defined by multiple scan lines and multiple data readout lines on the other surface of the substrate and positioned between the substrate and the cover layer; and multiple photo sensors positioned in the respective sensor pixels and sensing light transmitted on the base layer toward the substrate and total-reflected on a surface contacting a fingerprint of a user on the cover layer.

17 Claims, 12 Drawing Sheets

(56) References Cited

U.S. PATENT DOCUMENTS

| | | | | |
|---|---|---|---|---|
| 2013/0314148 A1* | 11/2013 | Kang | ............... | G06K 9/0002 |
| | | | | 327/517 |
| 2014/0028629 A1* | 1/2014 | Drumm | ............. | G06F 3/0308 |
| | | | | 345/175 |
| 2015/0331545 A1* | 11/2015 | Wassvik | ............... | G06F 3/042 |
| | | | | 345/173 |
| 2017/0109561 A1* | 4/2017 | Wyrwas | ............ | G06K 9/00053 |

FOREIGN PATENT DOCUMENTS

| KR | 10-1349924 | 1/2014 |
|---|---|---|
| KR | 10-1407936 | 6/2014 |

\* cited by examiner

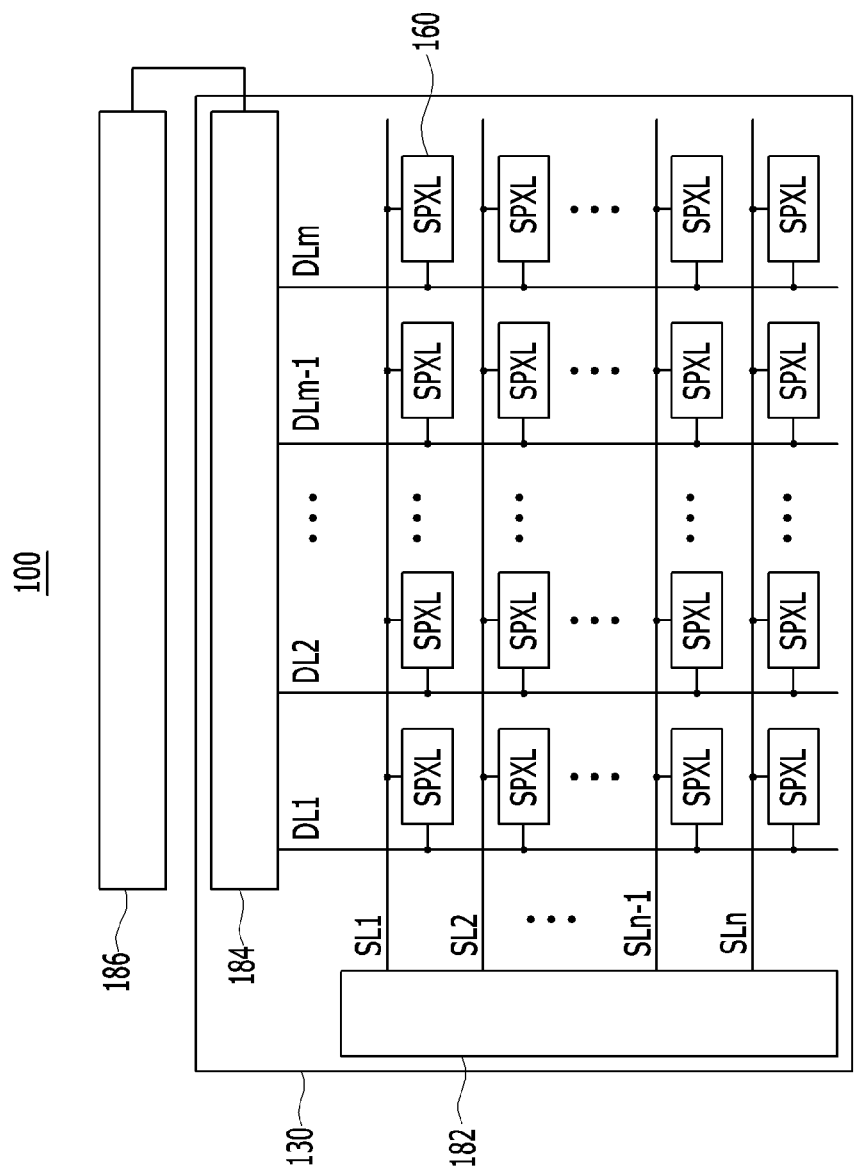

FINGERPRINT RECOGNITION SENSOR

CROSS-REFERENCE TO RELATED APPLICATION

This application claims priority to and the benefit of Korean Patent Application No. 10-2016-0070289 filed in the Korean Intellectual Property Office on Jun. 7, 2016, the entire contents of which are incorporated herein by reference.

BACKGROUND OF THE INVENTION (a) Field of the Invention

A fingerprint recognition sensor is provided.

(b) Description of the Related Art

A fingerprint recognition technology as a technology that determines whether a user is himself/herself by electronically reading a fingerprint of a finger of a user and comparing the read fingerprint and preinput data to verify an identity of the user is excellent in safety and convenience, low in manufacturing cost, and is applicable to various fields among bio recognition technologies.

Acquiring a high-quality image for the fingerprint is required for a reliable fingerprint recognition system having a high recognition rate and a low error rate and to this end, development of a fingerprint recognition sensor having more excellent performance is requested.

In recent years, a capacitive fingerprint recognition sensor and an optical fingerprint recognition sensor are widely used and the optical fingerprint recognition sensor is configured in a structure including a light source and an optical sensor and the optical sensor senses light emitted from the light source and reflected to sense the fingerprint of the user.

Korean Patent Registration No. 1,407,936 for the optical fingerprint recognition sensor includes an exemplary embodiment of a form to sense light reflected on the fingerprint by irradiating light from the bottom of a substrate.

However, transparency of the fingerprint recognition sensor is reduced due to a backlight unit positioned on the bottom of the substrate, and as a result, coupling with another device such as a display panel may not be easy.

Korean Patent Registration No. 1,349,924 for the optical fingerprint recognition sensor includes an exemplary embodiment that can irradiate the light from the bottom of the substrate and restrict an angle of light used for sensing the fingerprint according to a pattern of a black matrix.

However, the amount of light incident on a surface contacting the fingerprint is small due to the black matrix, and as a result, light use efficiency for the irradiated light may be low.

U.S. Pat. No. 9,245,167 for the optical fingerprint recognition sensor includes an exemplary embodiment (see FIG. 2A) of a form in which light emitted from the light source positioned on the side is reflected by a light guide and an exemplary embodiment (FIG. 5) of a form in which a minute prism structure is introduced on the bottom of the substrate to refract the light emitted from the light source toward a cover.

However, while a structure such as a reflection plate, or the like is positioned on the light guide and a structure such as a prism, or the like is positioned on the bottom of the substrate, the thickness of the fingerprint recognition sensor increases, a volume increases, and the transparency decreases, and as a result, coupling with another device such as the display panel may not be easy. Further, when the prism is used, only light having a predetermined incident angle in a narrow range is used, and as a result, the light efficiency may deteriorate and reliability of fingerprint recognition may deteriorate in media other than air. Further, manufacturing cost of the fingerprint recognition sensor may increase and a manufacturing process may be complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

A fingerprint recognition sensor according to an exemplary embodiment of the present invention has been made in an effort to enhance light efficiency by using all light having an incident angle of a predetermined angle or more.

A fingerprint recognition sensor according to an exemplary embodiment of the present invention has been made in an effort to enhance reliability of fingerprint recognition in media other than air by using all light having an incident angle of a predetermined angle or more.

A fingerprint recognition sensor according to an exemplary embodiment of the present invention has been made in an effort to reduce the thickness and the volume of the fingerprint recognition sensor.

A fingerprint recognition sensor according to an exemplary embodiment of the present invention has been made in an effort to enhance transparency.

A fingerprint recognition sensor according to an exemplary embodiment of the present invention has been made in an effort to facilitate coupling with another device.

A fingerprint recognition sensor according to an exemplary embodiment of the present invention has been made in an effort to reduce manufacturing cost and simplify a manufacturing process.

The exemplary embodiment of the present invention may be used for achieving other objects which are not mentioned in detail in addition to the objects.

An exemplary embodiment of the present invention provides a fingerprint recognition sensor including: a backlight unit including a base layer positioned on one surface of a substrate and including a transparent material and a light source irradiating light to the inside of the base layer on one side of the base layer, in which light of which an incident angle on a surface facing the substrate is larger than a critical angle in the light irradiated from the light source is transmitted toward the substrate. Further, a cover layer spaced apart from the substrate and facing the other surface of the substrate; multiple sensor pixels defined by multiple scan lines and multiple data readout lines on the other surface of the substrate and positioned between the substrate and the cover layer; and multiple photo sensors positioned in the respective sensor pixels and sensing the light transmitted from the base layer toward the substrate and total-reflected on a surface contacting a fingerprint of a user on the cover layer.

The base layer may be formed to be larger than the substrate, and the base layer may include a light transmission unit overlapped with the substrate, and a light guide unit not overlapped with the substrate and positioned between the light source and the light transmission unit.

In the light guide unit, light of which an angle between the light and a normal of the interface between the light guide unit and the external material is larger than the critical angle in the light irradiated from the light source is guided to the light transmission unit.

The backlight unit may further include a light direction switching member positioned on the front surface of the light source, and the light direction switching member may deflect light irradiated from the light source so that the incident angle on the surface facing the substrate in the base layer is larger than the critical angle.

The light direction switching member may include a lens, a prism, or a mirror.

The base layer may include a first surface facing the substrate and a second surface which is an opposite surface to the first surface, and at least a part of the second surface may have a shape to be inclined toward the first surface while being distant from the light source.

The second surface of the base layer may include two or more protrusions having a shape to be inclined toward the first surface while being distant from the light source.

The base layer may include a first surface facing the substrate and a second surface which is an opposite surface to the first surface, and at least a part of the second surface may have a shape to be inclined to be distant from the first surface while being distant from the light source.

The base layer may include a first surface facing the substrate and a second surface which is an opposite surface to the first surface, and at least a part of the first surface of the light guide unit may have a shape to be inclined to be distant from the second surface while being distant from the light source.

A refractive index of the cover layer may be larger than 1.0 and equal to or less than 2.0.

The critical angle may be equal to or more than 30° and less than 90°.

The fingerprint recognition sensor may further include a first optical adhesive layer positioned between the photo sensor and the cover layer, including the transparent material, and having a refractive index which is the same as the refractive index of the cover layer.

The fingerprint recognition sensor may further include a second optical adhesive layer positioned between the substrate and the base layer, including the transparent material, and having the same refractive index with the substrate.

The fingerprint recognition sensor may further include multiple thin film transistors connected to the multiple scan lines and the multiple data readout lines and transmitting a current signal depending on resistance variation of each photo sensor to the multiple data readout lines.

Each photo sensor may include a first electrode formed by extending the drain electrode of the thin film transistor, a semiconductor layer positioned on the first electrode, and a second electrode including the transparent material and positioned on the semiconductor layer, and the first electrode and the second electrode form a capacitor.

The fingerprint recognition sensor may further include a scan line driver driving the multiple scan lines; and a readout controller supplying the current signal of each photo sensor to a readout driver through the data readout lines.

The thin film transistor may have one structure of a co-planar structure, a staggered structure, an inverted co-planar structure, and an inverted staggered structure.

A channel layer of the thin film transistor may include a low-temperature polycrystalline silicon(LTPS), an amorphous silicon(a-Si), or an oxide.

A semiconductor layer of the photo sensor may include the an amorphous silicon(a-Si), an organic material, or a quantum dot.

Another exemplary embodiment of the present invention provides a fingerprint recognition sensor including: a backlight unit including a base layer and a light source irradiating light to the inside of the base layer on one side of the base layer; a cover layer spaced apart from the base layer and facing the base layer; multiple sensor pixels defined by multiple scan lines and multiple data readout lines on the base layer and positioned between the base layer and the cover layer; and multiple photo sensors positioned in the respective sensor pixels and sensing light transmitted from the base layer toward the cover layer and total-reflected on a surface contacting a fingerprint of a user on the cover layer.

Herein, light of which an incident angle on a surface facing the cover layer in the base layer is larger than a critical angle in the light irradiated from the light source may be transmitted toward the cover layer.

According to an exemplary embodiment of the present invention, a fingerprint recognition sensor can enhance light efficiency by using all light having an incident angle at a predetermined angle or more, enhance reliability of fingerprint recognition in media other than air, reduce the thickness and the volume of the fingerprint recognition sensor, enhance transparency, facilitate coupling with another device, and reduce manufacturing cost and simplify a manufacturing process.

BRIEF DESCRIPTION OF THE DRAWINGS

FIG. 1A is a diagram for describing an overall driving scheme of a fingerprint recognition sensor according to an exemplary embodiment.

DETAILED DESCRIPTION OF THE EMBODIMENTS

Figure 1B:
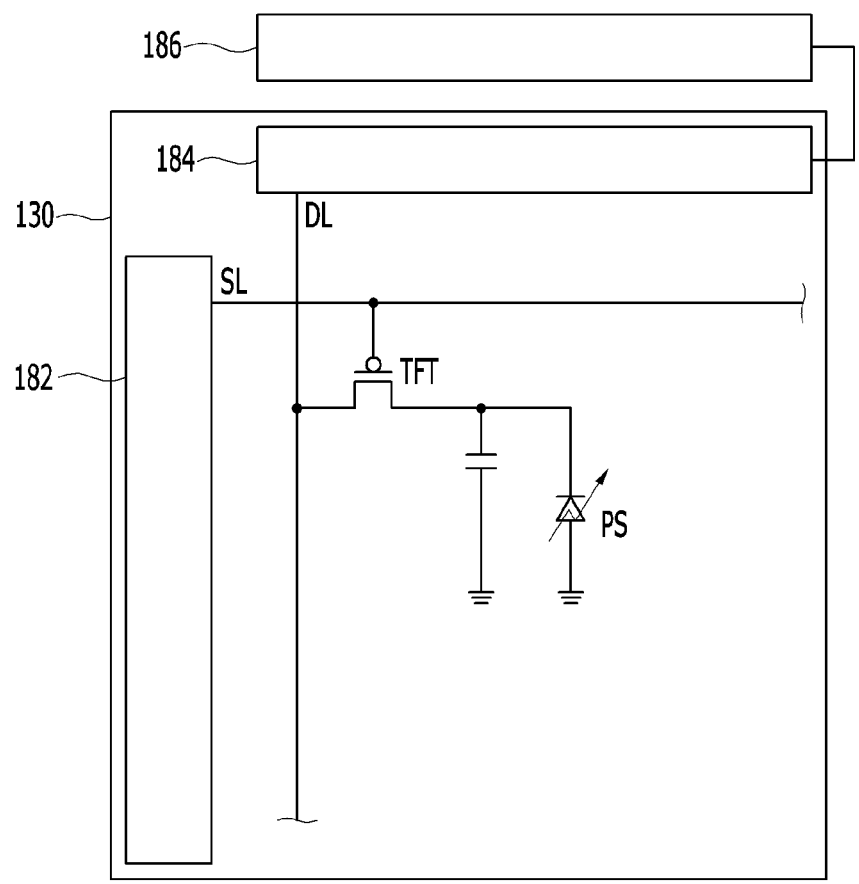
FIG. 1B is a diagram illustrating a driving scheme of one sensor pixel in the fingerprint recognition sensor of FIG. 1A.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, a part which is not associated with description in order to clearly describe the present invention and like reference numerals designate like elements throughout the specification. Further, detailed description of known art which is widely known will be omitted.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Meanwhile, when an element is referred to as being "directly on" another element, there are no intervening elements present. On the contrary, when it is described that a certain part such as a layer, a film, a region and a plate is located "beneath" another part, it means that the certain part may be located "directly beneath" on the another part and a third part may be interposed therebetween as well. Meanwhile, when an element is referred to as being "directly beneath" another element, there are no intervening elements present.

Throughout the specification, unless explicitly described to the contrary, the word "comprise" and variations such as "comprises" or "comprising", will be understood to imply the inclusion of stated elements but not the exclusion of any other elements.

FIG. 1A is a diagram for describing an overall driving scheme of a fingerprint recognition sensor according to an exemplary embodiment and FIG. 1B is a diagram illustrating a driving scheme of one sensor pixel in the fingerprint recognition sensor of FIG. 1A.

Referring to FIGS. 1A and 1B, the fingerprint recognition sensor 100 includes multiple scan lines SL1 to SLn and multiple data readout lines DL1 to DLm positioned on a substrate 130. Herein, the multiple scan lines SL1 to SLn are disposed to be spaced apart from each other in parallel and the multiple data readout lines DL1 to DLm are also disposed to be spaced apart from each other in parallel. The multiple scan lines SL1 to SLn and the multiple data readout lines DL1 to DLm cross each other and a sensor pixel (SPXL) 160 is defined in every cross area.

The sensor pixel 160 includes a thin film transistor TFT electrically connected to the multiple scan lines SL1 to SLn and the multiple data readout lines DL1 to DLm to switch each sensor pixel 160 and a photo sensor PS connected with a drain electrode of the thin film transistor TFT.

A gate electrode of the thin film transistor TFT is connected with the scan line (SL), a source electrode is connected with the data readout line DL, and the drain electrode is connected with the photo sensor PS. Herein, two electrodes included in the photo sensor PS may form a capacitor.

The fingerprint recognition sensor 100 may include a scan line driver 182 driving the multiple scan lines SL1 to SLn and a readout controller 184 and a readout driver 186 driving the multiple data readout lines DL1 to DLm.

The scan line driver 182 supplies a gate signal to the scan line SL. The scan line driver 182 may select the scan line SL of the sensor pixel 160 detecting a fingerprint image and the thin film transistor TFT may be turned on. Although not illustrated, the scan line driver 182 may include a shift register generating the gate signal to sequentially supply the gate signal to the thin film transistor TFT and a level shifter level-shifting the gate signal supplied to the sensor pixel 160 into high voltage required for switching.

The readout controller 184 and the readout driver 186 detect a current signal generated by the sensor pixel 160 selected by the gate signal. Although not illustrated, the readout controller 184 may include a multiplexer selecting one of the multiple data readout lines DL1 to DLm and outputting the selected data readout line to the readout driver 186, the shift register generating a switching signal of the multiplexer, and the level shifter boosting output voltage from the shift register.

When light reflected on a fingerprint reaches the photo sensor PS and the current signal depending on resistance variation is thus generated, electric charges are stored in the capacitor and when the thin film transistor TFT is turned on, the stored electric charges may be transmitted to the data readout line DL through the thin film transistor TFT and transmitted to the readout driver 186 by the readout controller 184.

Figure 2:
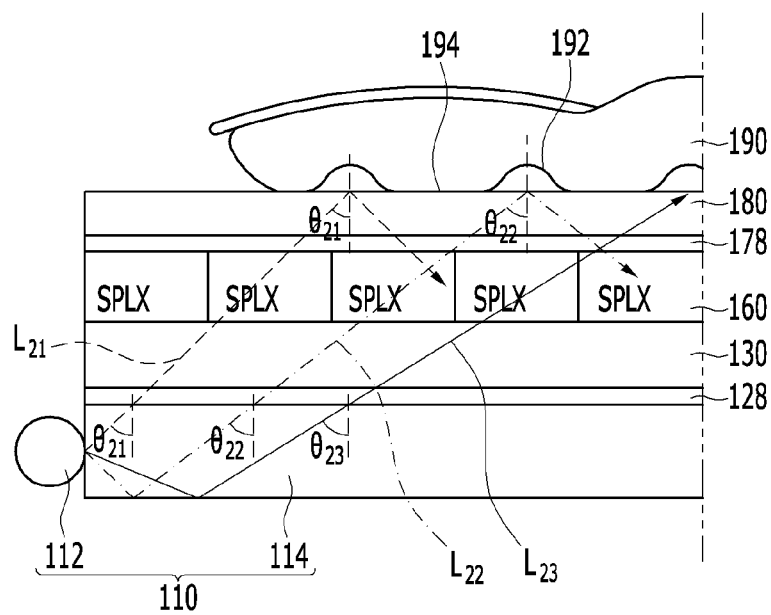
FIG. 2 is a diagram schematically illustrating a cross-section of the fingerprint recognition sensor according to an exemplary embodiment.

FIG. 2 is a diagram schematically illustrating a cross-section of the fingerprint recognition sensor according to an exemplary embodiment.

Referring to FIGS. 1A to 2, the fingerprint recognition sensor 100 includes a backlight unit 110 including a base layer 114 positioned on one surface of the substrate 130 and including a transparent material and a light source 112 irradiating light to the inside of the base layer 114 on one side of the base layer 114. Further, the fingerprint recognition sensor 100 includes a cover layer 180 spaced apart from the substrate 130 and facing the other surface of the substrate 130, multiple sensor pixels 160 defined in areas where multiple scan lines SL1 to SLn and multiple data readout lines DL1 to DLm on the other surface of the substrate 130 cross each other and positioned between the substrate 130 and the cover layer 180, and multiple photo sensors PS positioned in the respective sensor pixels 160 and sensing light $L_{21}$, $L_{22}$, and $L_{23}$ transmitted on the base layer 114 toward the substrate 130 and total-reflected on a surface contacting a fingerprint 190 of a user on the cover layer 180.

In the present specification, a critical angle means a reference angle at which the light reaching the covers layer 180 may be total-reflected on the surface contacting the fingerprint 190 on the cover layer 180.

The user contacts a finger on one surface (an upper surface in the drawing) of the cover layer 180 of the fingerprint recognition sensor 100 to make the fingerprint 190 be recognized. Light $L_{21}$, $L_{22}$, and $L_{23}$ in which incident angles $\theta_{21}$, $\theta_{22}$, and $\theta_{23}$ on the surface (the upper surface in the drawing) facing the substrate 130 are larger than the critical angle in the base layer 114 in the light irradiated from the light source 112 are transmitted toward the substrate 130 to reach the cover layer 180 and the light $L_{21}$, $L_{22}$, and $L_{23}$ may be total-reflected on the surface contacting the fingerprint 190 in the cover layer 180. The total reflection of the light may be primarily achieved at a valley 192 of the fingerprint, some light may be absorbed in or refracted on the fingerprint at a ridge 194 of the fingerprint, and such a difference may be sensed by the photo sensor PS.

Herein, the incident angle on the surface facing the substrate 130 in the base layer 114 may mean an angle formed by the light and a normal of the surface facing the substrate 130 in the base layer 114.

The cover layer 180 includes the transparent material and may include a material such as glass or plastic.

A refractive index of the cover layer 180 may be larger than that of an external material (air, water, etc.,) of the cover layer 180. For example, the refractive index of the cover layer 180 may be large than approximately 1.0 and equal to or smaller than approximately 2.0. When the refractive index of the cover layer 180 is within such a range, the critical angle may be equal to or more than 30° and less than 90°.

For example, when the external medium of the cover layer 180 is the air (the refractive index is approximately 1.0) and the cover layer 180 is made of the glass material having the refractive index of approximately 1.5, the critical angle may be approximately 42° and light having an angle larger than 42° is emitted from the backlight unit 110 of the cover layer 180 to be total-reflected on the cover layer 180.

Further, for example, when the external medium of the cover layer 180 is the water (the refractive index is approximately 1.3) and the cover layer 180 is made of the glass material having the refractive index of approximately 1.5, the critical angle may be approximately 60° and light having an angle larger than 60° is emitted from the backlight unit 110 of the cover layer 180 to be total-reflected on the cover layer 180.

In addition, for example, when the external medium of the cover layer 180 is the air and the cover layer 180 includes high-density special glass having a refractive index of approximately 1.9, the critical angle may be approximately 32° and light having an angle larger than 32° is emitted from the backlight unit 110 of the cover layer 180 to be total-reflected on the cover layer 180.

Moreover, for example, when the external medium of the cover layer 180 is the air and the cover layer 180 includes a material having a refractive index of approximately 2.0, the critical angle may be approximately 30° and light having an angle larger than 30° is emitted from the backlight unit 110 of the cover layer 180 to be total-reflected on the cover layer 180.

The refractive indexes of components between the base layer 114 and the cover layer 180 of the backlight unit 110 may have the same or similar refractive index as the cover layer 18. Accordingly, light which transmitted toward the substrate 130 on the base layer 114 and proceeds to the cover layer 180 may travel while being not almost refracted. As a result, the incident angles $\theta_{21}$, $\theta_{22}$, and $\theta_{23}$ of the light irradiated from the light source 112 in the surface facing the substrate 130 in the base layer 114 may be the same as or similar to an angle at which the light is transmitted toward the substrate 130 to be incident in the cover layer 180. Further, the incident angles $\theta_{21}$, $\theta_{22}$, and $\theta_{23}$ of the light irradiated from the light source 112 in the surface facing the substrate 130 in the base layer 114 may be the same as or similar to an incident angle in the surface contacting the fingerprint 190 of the user in the cover layer 180.

In the fingerprint recognition sensor in the related art, which reflects the light irradiated from the light source on the surface contacting the fingerprint by using a prism, since light having an incident angle in a narrow range is used, light efficiency may deteriorate and reliability of fingerprint recognition may deteriorate in the medium such as the water other than the air.

On the contrary, since the fingerprint recognition sensor 100 according to the exemplary embodiment may perform the fingerprint recognition by using all light having an incident angle equal to or larger than an angle larger than a predetermined angle (critical angle), light use efficiency of the light irradiated from the light source 112 may be enhanced. Further, since the fingerprint recognition sensor 100 may acquire a clear fingerprint image even in the medium such as the water, the reliability of the fingerprint recognition may be significantly enhanced.

In addition, the fingerprint recognition sensor 100 may not include the structure such as the prism or the reflection plate, the thickness of the fingerprint recognition sensor 100 may decrease due to the light source 112 positioned on the side of the base layer 114 of the backlight unit 110, the volume of the fingerprint recognition sensor 100 may be reduced, manufacturing cost may be reduced, and a manufacturing process may be simplified. Further, the light source 112 is positioned on the side of the base layer 114 to significantly enhance transparency of the fingerprint recognition sensor 100, and as a result, the fingerprint recognition sensor 100 may be used while being coupled with another device such as a display panel, or the like and users may perform a fingerprint recognition function simultaneously while viewing an image output from the display panel.

The substrate 130 includes the transparent material and may include, for example, the glass or plastic material, but the present invention is not limited thereto.

The base layer 114 includes the transparent material and may include, for example, the glass material or an acryl material, but any material having a refractive index value in the same range as the cover layer 180 may be applied to the base layer 114.

The light source 112 is positioned on one side of the base layer 114 and may be, for example, an LED. Further, the light source 112 may be positioned on the entirety or a part of one side of the base layer 114 and the positions, the shapes, the number, and the like of light sources may vary depending on a design.

The fingerprint recognition sensor 100 may further include a first optical adhesive layer 178 positioned between the photo sensor PS and the cover layer 180, including the transparent material, and having a refractive index which is the same as the refractive index of the cover layer 180. The first optical adhesive layer 178 may enhance adhesive power between the cover layer 180 and a lower component and has the same refractive index as the cover layer 180 to just maintain a traveling direction of the light emitted from the base layer 114. Accordingly, the incident angle of the light irradiated from the light source 112 in the surface facing the substrate 130 in the base layer 114 may be the same as or similar to the incident angle the surface contacting the fingerprint 190 of the user in the cover layer 180. Further, the first optical adhesive layer 178 and the cover layer 180 have the same refractive index to minimize an optical coupling phenomenon.

In addition, the fingerprint recognition sensor 100 may further include a second optical adhesive layer 128 positioned between the substrate 130 and the base layer 114, including the transparent material, and having the same refractive index with the substrate 130. The second optical adhesive layer 128 may enhance the adhesive power between the cover layer 130 and the substrate 130 and has the same refractive index as the substrate 130 to just maintain the traveling direction of the light emitted from the base layer 114. Accordingly, the incident angle of the light irradiated from the light source 112 in the surface facing the substrate 130 in the base layer 114 may be the same as or similar to the incident angle on the surface contacting the fingerprint 190 of the user in the cover layer 180.

Hereinbelow, when the same structure as the aforementioned exemplary embodiment is included, description thereof may be omitted.

Figure 3:
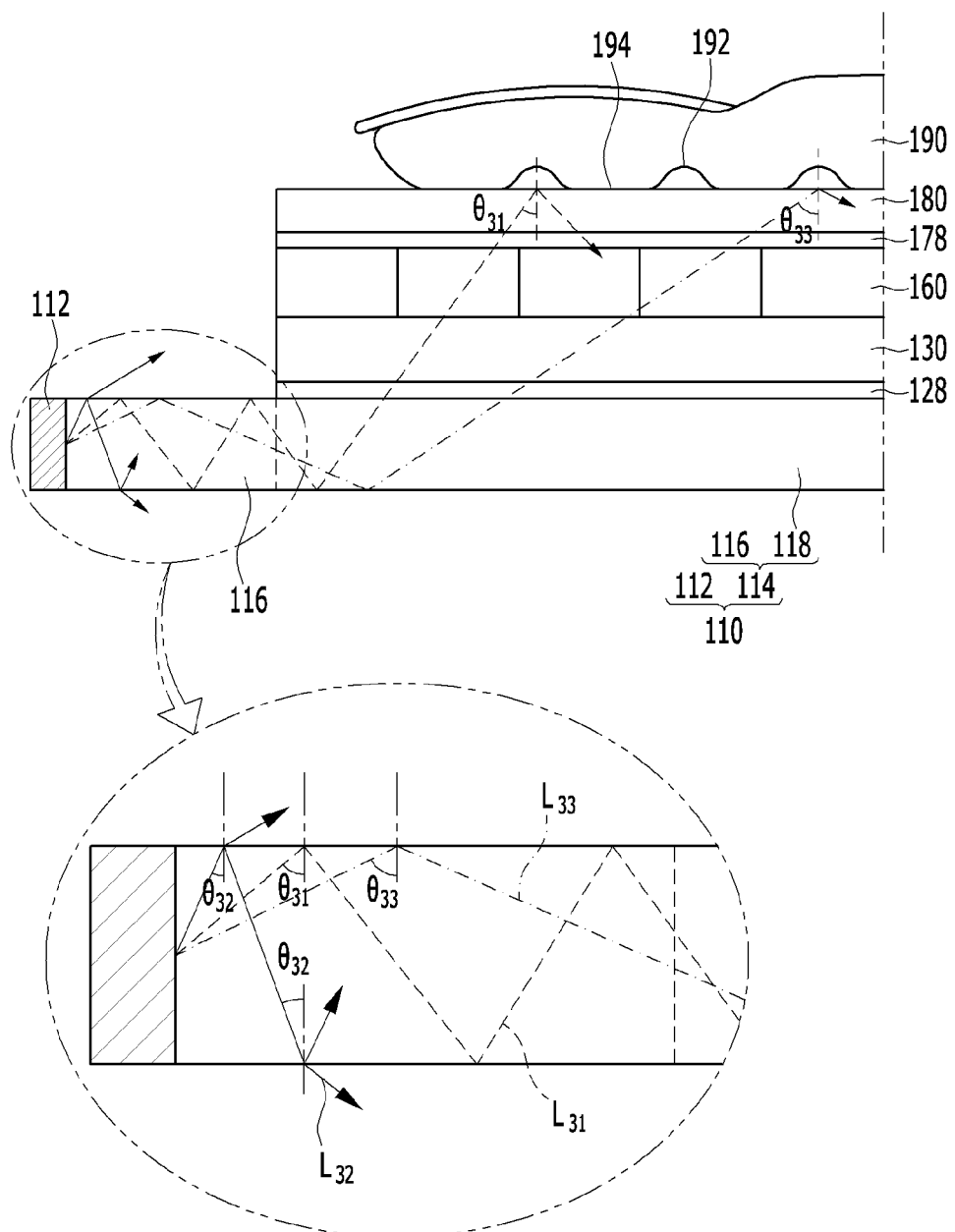
FIG. 3 is a diagram schematically illustrating a cross-section of the fingerprint recognition sensor according to an exemplary embodiment.

FIG. 3 is a diagram schematically illustrating a cross-section of the fingerprint recognition sensor according to an exemplary embodiment.

Referring to FIG. 3, the base layer 114 may be formed to be larger than the substrate 130. Herein, the base layer 114 may be divided into an area overlapped with the substrate 130 and an area not overlapped with the substrate 130. The area overlapped with the substrate 130 in the base layer 114 may be a light transmission unit 118 and an area not overlapped with the substrate 130 and positioned between the light source 112 and the light transmission unit 118 may be a light guide unit 116.

The light guide unit 116 may guide light $L_{31}$ and $L_{33}$ of which an angle between each light $L_{31}$ and $L_{33}$ and a normal of the interface between the light guide unit 116 and the external material (for example, the air or water) is larger than the critical angle among light $L_{31}$, $L_{32}$, and $L_{33}$ irradiated from the light source 112 to the light transmission unit 118. For example, the angle between the light $L_{31}$ and the normal is larger than the critical angle, thus the light $L_{31}$ is guided to the light transmission unit 118. However, the angle between the light $L_{32}$ and the normal is smaller than the critical angle, thus the light $L_{32}$ is not guided to the light transmission unit 118.

For example, the base layer 114 of the fingerprint recognition sensor 100 may include the acryl material, the cover layer 180 may include the glass material, and the external material of the fingerprint recognition sensor 100 may be the air. The refractive index of the acryl may be approximately 1.5, the refractive index of the glass may be approximately 1.5, and the refractive index of the air may be approximately 1.0. In this case, a critical angle at which the light which reaches the cover layer 180 by passing through the base layer 114 is total-reflected on a surface contacting the fingerprint in the cover layer 180 is approximately 42°. Further, an angle at which the light is total-reflected on one surface or the other surface of the light guide unit 116 which is not overlapped with the substrate 130 in the base layer 114 is also approximately 42°.

$31^{st}$ light $L_{31}$ and $33^{rd}$ light $L_{33}$ of which angles $\theta_{31}$ and $\theta_{33}$ between the light and the normal of the interface between the light guide unit 116 and the air are larger than approximately 42° which is the critical angle are total-reflected on both surface of the light guide unit 116 to be guided to the light transmission unit 118. Thereafter, the light is transmitted toward the substrate 130 to reach the cover layer 180.

On the contrary, $32^{nd}$ light $L_{32}$ of which an angle $\theta_{32}$ between the light and the normal of the interface between the light guide unit 116 and the air is smaller than approximately 42° which is the critical angle is not total-reflected on both surfaces of the light guide unit 116 and some is reflected and some is refracted to be discharged to the outside. Accordingly, the intensity of the light $L_{32}$ may gradually decrease or may become extinct while the light $L_{32}$ travels to the light transmission unit 118 and as the length of the light guide unit 116 increases, the intensity may be further weak or the light may become extinct. As a result, the light $L_{31}$ and $L_{33}$ in which the incident angle on the surface contacting the fingerprint in the cover layer 180 is approximately 42° or more is total-reflected and the light $L_{31}$ and $L_{33}$ may be sensed by the photo sensor PS.

Since the fingerprint recognition sensor in the related art does not include a part not overlapped with the substrate, such as the light guide unit 116 of the exemplary embodiment, when the light is irradiated from the side light source, the light is diffused-reflected in all directions to reach the photo sensor, and as a result, the reliability of the fingerprint recognition and definition of the fingerprint image may deteriorate.

On the contrary, in the fingerprint recognition sensor 100 according to the exemplary embodiment, the light irradiated from the light source in all directions is filtered by the light guide unit 116, and as a result, the photo sensor PS recognizes the light total-reflected by the cover layer 180. The light having the incident angle smaller than the critical angle may become extinct or the intensity of the light may become weak in the light guide unit 116. Accordingly, the reliability of the fingerprint recognition may be enhanced and the recognized fingerprint image may be further definite.

Figure 4:
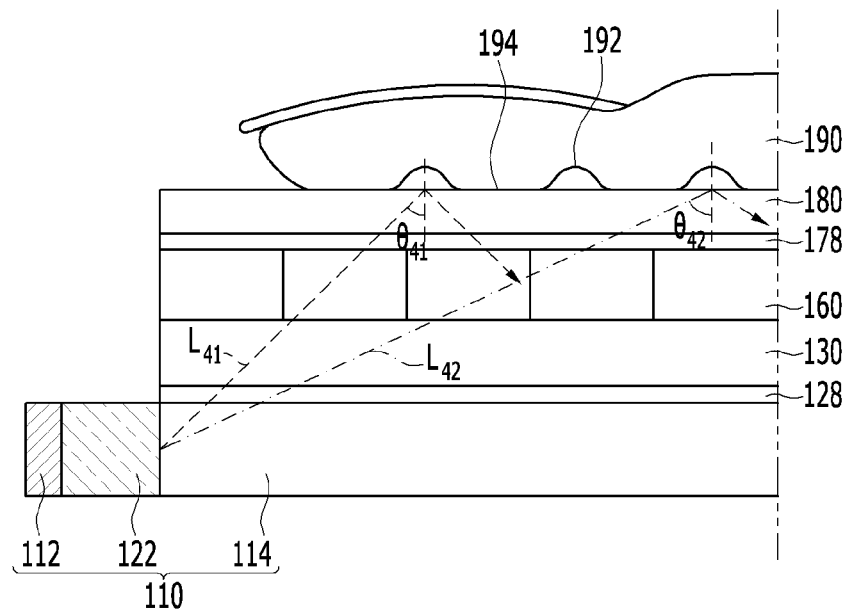
FIG. 4 is a diagram schematically illustrating a cross-section of the fingerprint recognition sensor according to an exemplary embodiment.

FIG. 4 is a diagram schematically illustrating a cross-section of the fingerprint recognition sensor according to an exemplary embodiment.

Referring to FIG. 4, the backlight unit 110 of the fingerprint recognition sensor 100 may further include a light direction switching member 122 positioned on the front surface of the light source 112. Herein, the light direction switching member 122 may deflect light $L_{41}$ and $L_{42}$ irradiated from the light source 112 so that incident angles $\theta_{41}$ and $\theta_{42}$ in the surface facing the substrate 130 in the base layer 114 are larger than the critical angle. $41^{st}$ light $L_{41}$ and $42^{nd}$ light $L_{42}$ are transmitted toward the substrate 130 to be totally reflected on the surface contacting the fingerprint in the cover layer 180.

In FIG. 4, only a case in which the light direction switching member 122 deflects the light in a direction toward the cover layer 180 is illustrated, but the light direction switching member 122 may be designed so that the light is deflected in an opposite direction to the cover layer 180 and thereafter, total-reflected on the base layer 114 and totally reflected on the cover layer 180 again.

Since the fingerprint recognition sensor in the related art does not include a structure such as the light direction switching member 122 positioned just on the front of the light source 112 of the exemplary embodiment, when the light is irradiated from the side light source, the light is diffused-reflected in all directions to reach the photo sensor, and as a result, the reliability of the fingerprint recognition and the definition of the fingerprint image may deteriorate.

On the contrary, in the fingerprint recognition sensor 100 according to the exemplary embodiment, the light irradiated from the light source in all directions is deflected by the light direction switching member 122, and as a result, the photo sensor PS recognizes the light totally reflected by the cover layer 180. Accordingly, the reliability of the fingerprint recognition may be enhanced and the recognized fingerprint image may be further definite.

The light direction switching member 122 may be, for example, a lens, a prism, or a mirror. The light direction switching member 122 is not positioned on the bottom of the substrate 130, but positioned on the front surface of the light source 112 on one side of the base layer 114, and as a result, the transparency of the fingerprint recognition sensor 100 may be enhanced and a coupling property with another device may be enhanced. Further, since the quantity of materials required for the light direction switching member 122 is relatively smaller than the fingerprint recognition sensor in the related art, manufacturing cost may be reduced. The shapes or the number of the light direction switching members 122 may vary depending on the light source.

FIGS. 5 to 8 are diagrams schematically illustrating a cross-section of the fingerprint recognition sensor according to exemplary embodiments.

The base layer 114 of the fingerprint recognition sensor 100 may include a first surface 115a facing the substrate 130 and a second surface 115b which is an opposite surface to the first surface 115a. Further, the base layer 114 may include the light transmission unit 118 overlapped with the substrate 130 and the light guide unit 116 not overlapped with the substrate.

Figure 5:
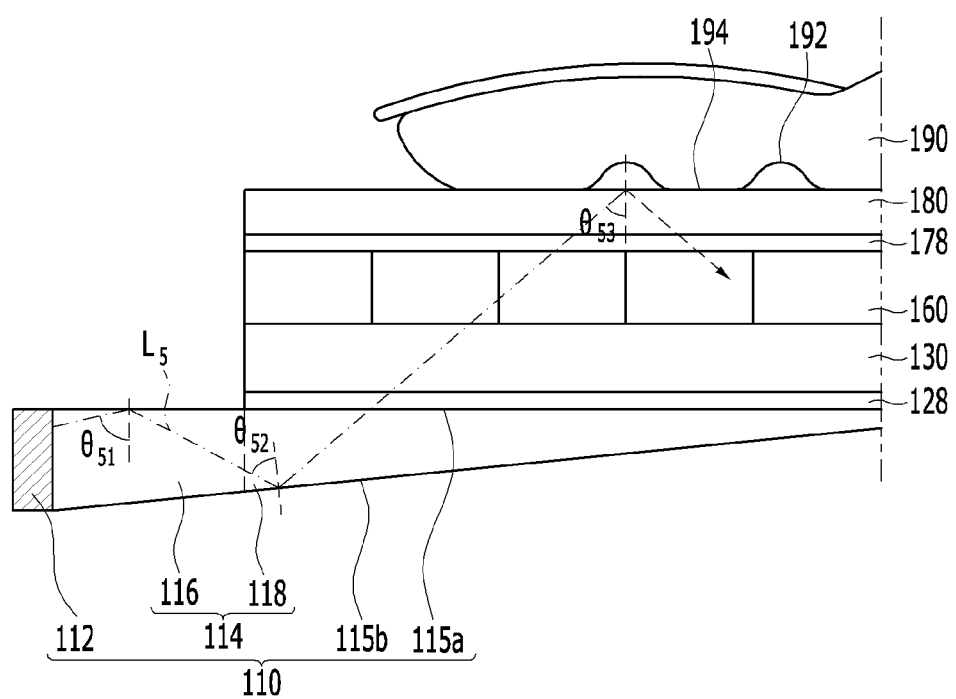
FIG. 5 is a diagram schematically illustrating a cross-section of the fingerprint recognition sensor according to an exemplary embodiment.

Referring to FIG. 5, at least a part of the second surface 115*b* may have a shape to be inclined toward the first surface 115*a* while being distant from the light source 112. Like fifth light $L_5$, a first incident angle $\theta_{51}$ in the first surface 115*a* is excessively large (for example, 70° or more), and as a result, the fifth light $L_5$ may not reach the cover layer 180 when the second surface 115*b* is parallel to the first surface 115*a*. On the contrary, a subsequent incident angle 852 in the second surface 115*b* may be reduced due to the inclined shape illustrated in FIG. 5 and while an incident angle $\theta_{53}$ in the top of the cover layer 180 further decreases, the incident angle $\theta_{53}$ may be used for the fingerprint recognition. Accordingly, the light use efficiency for the light irradiated from the light source 112 may be enhanced.

Figure 6:
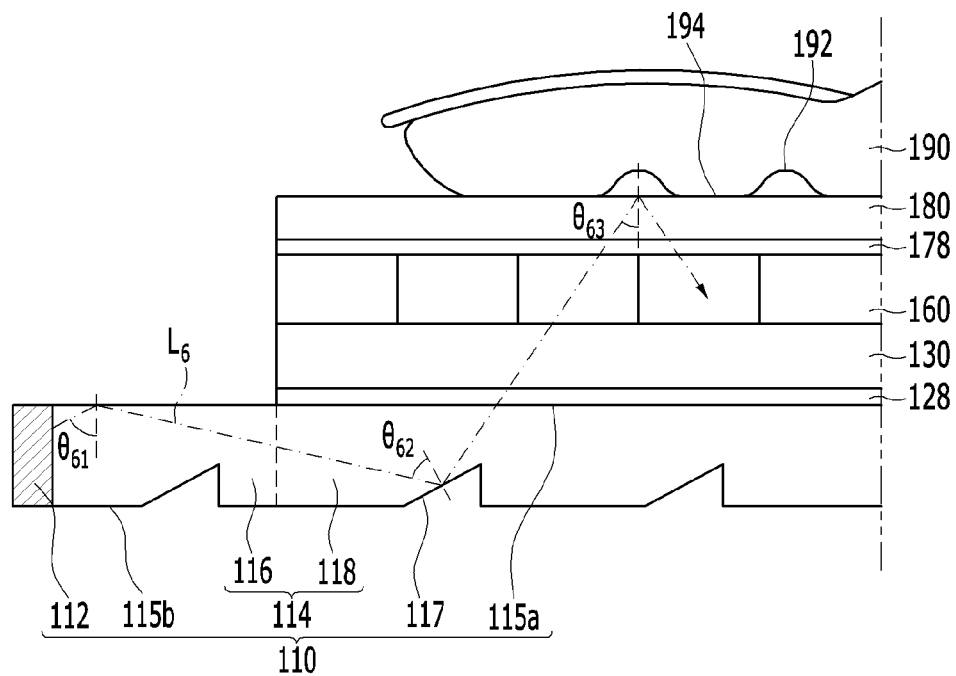
FIG. 6 is a diagram schematically illustrating a cross-section of the fingerprint recognition sensor according to an exemplary embodiment.

Referring to FIG. 6, the second surface 115*b* may include two or more protrusions 117 having a shape to be inclined toward the first surface 115*a* while being distant from the light source 112. In the case of sixth light $L_6$ toward the protrusions, while an incident angle $\theta_{62}$ in the second surface 115*b* is smaller than a first incident angle $\theta_{61}$ in the first surface 115*a* and an incident angle $\theta_{63}$ in the top further decreases, the sixth light $L_6$ ma be used for the fingerprint recognition. Accordingly, the light use efficiency may be enhanced.

Figure 7:
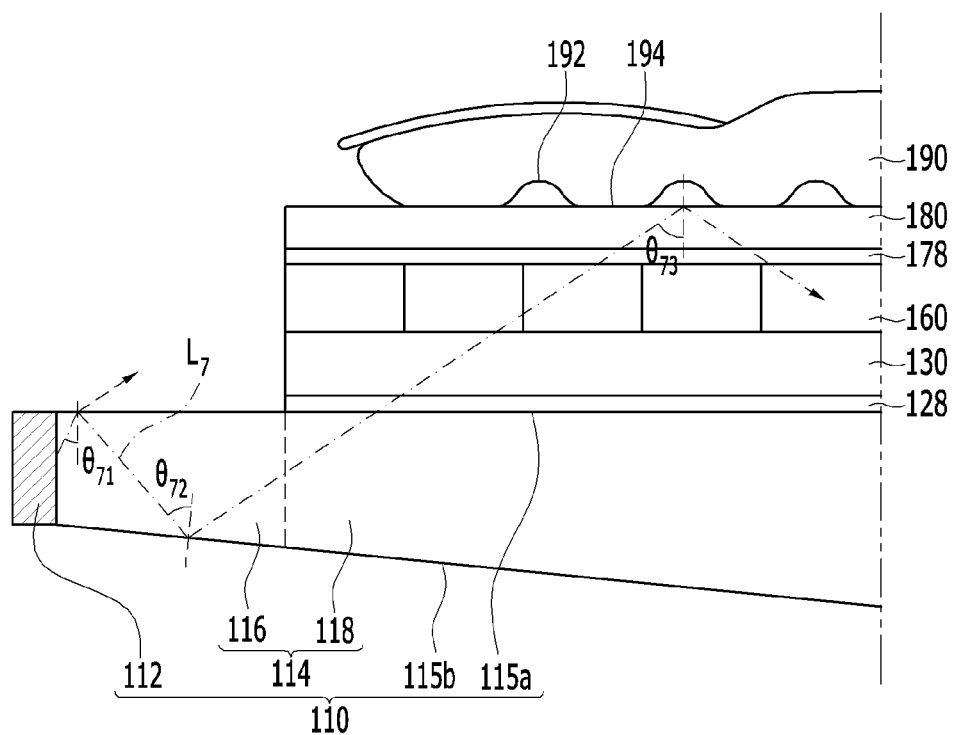
FIG. 7 is a diagram schematically illustrating a cross-section of the fingerprint recognition sensor according to an exemplary embodiment.

Referring to FIG. 7, at least a part of the second surface 115*b* may have a shape to be inclined to be distant from the first surface 115*a* while being distant from the light source 112. In the case of seventh light $L_7$ in which the incident angle on the first surface 115*a* is smaller than a totally reflected critical angle on the interface between the light guide unit 116 and the external material, some of the seventh light $L_7$ may be refracted and discharged to the outside. In this case, due to the inclination shape of FIG. 7, while an incident angle $\theta_{72}$ in the second surface 115*b* increases, the incident angle $\theta_{72}$ may be larger than the total-reflection critical angle. Accordingly, the seventh light $L_7$ may not become extinct, but reach the cover layer 180 and may be used for the fingerprint recognition and the light use efficiency may be enhanced.

Figure 8:
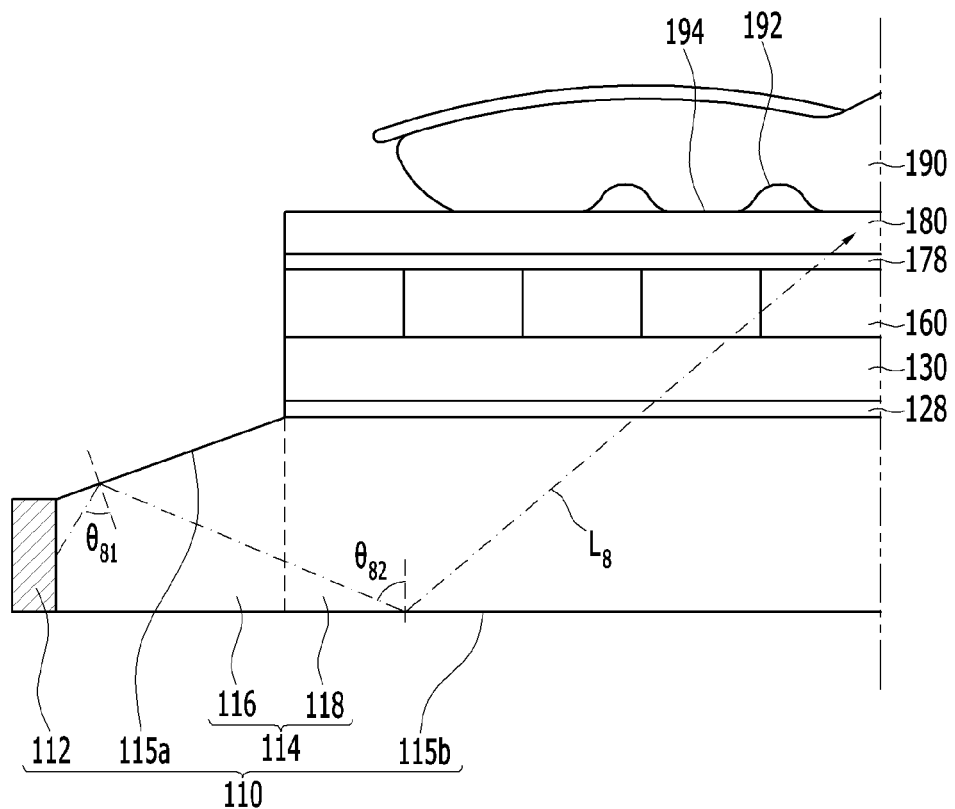
FIG. 8 is a diagram schematically illustrating a cross-section of the fingerprint recognition sensor according to an exemplary embodiment.

Referring to FIG. 8, at least a part of the first surface 115*a* of the light guide unit 116 may have a shape inclined to be distant from the second surface 115*b* while being distant from the light source 112. In the case of eighth light $L_8$ in which an incident angle $\theta_{81}$ in the first surface 115*a* is smaller than the total-reflection critical angle on the interface of the light guide unit 116 and the external material, an incident angle $\theta_{82}$ in the second surface 115*b* may increase due to the inclined shape of the first surface 115*a*. Accordingly, the eighth light $L_8$ may not become extinct, but reach the cover layer 180 and may be used for the fingerprint recognition and the light use efficiency may be enhanced.

Figure 9:
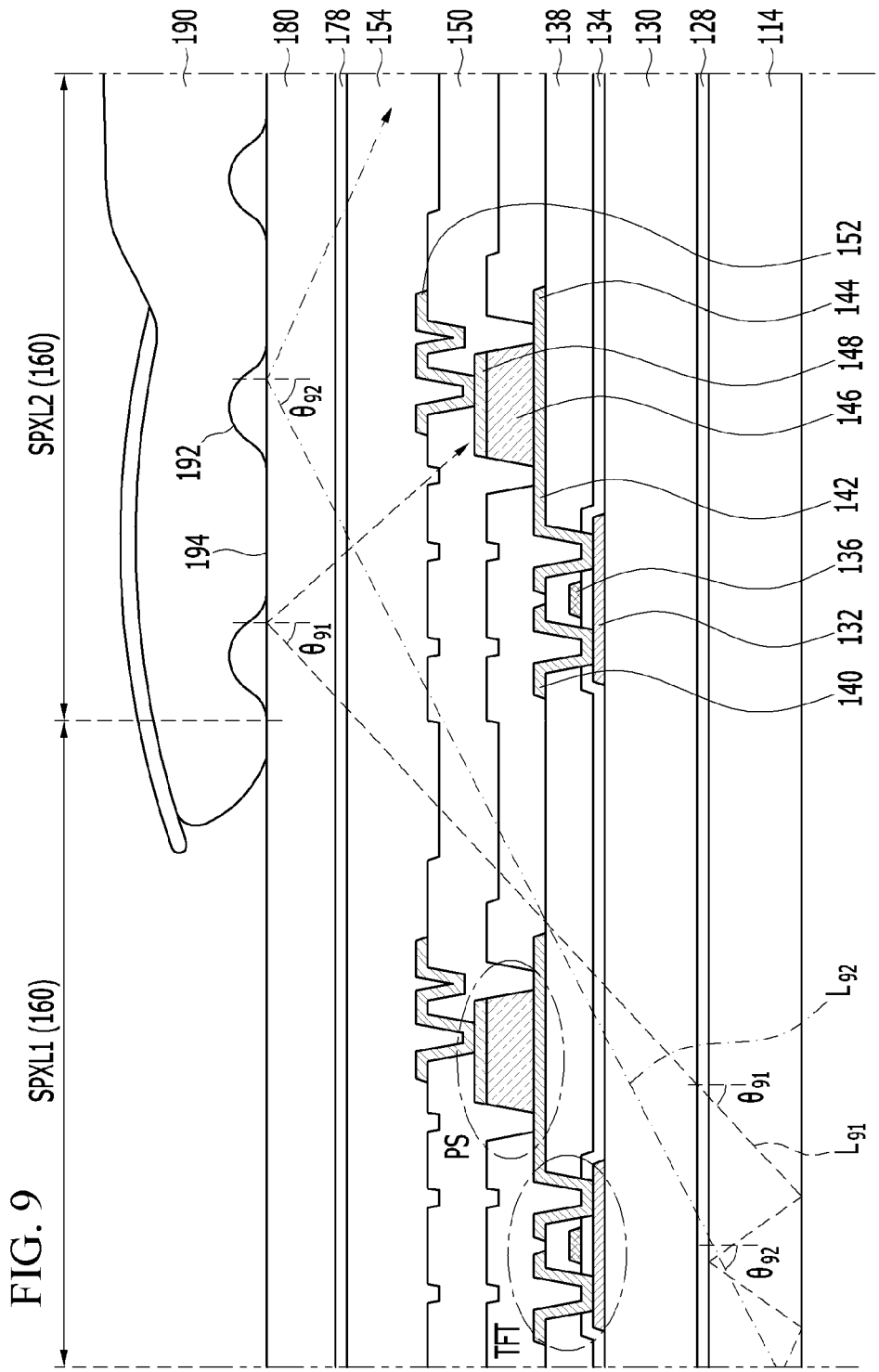
FIG. 9 is a diagram specifically illustrating a cross-section of the fingerprint recognition sensor according to an exemplary embodiment.

FIG. 9 is a diagram specifically illustrating a cross-section of the fingerprint recognition sensor according to an exemplary embodiment. FIG. 9 illustrates cross-sections corresponding to areas corresponding to two sensor pixels (SPXL1 and SPXL2) 160. Further, incident angles $\theta_{91}$ and $\theta_{92}$ of two light $L_{91}$ and $L_{92}$ illustrated in FIG. 9 in the top of the cover layer 180 may be larger than the critical angle for the full reflection.

Referring to FIG. 9, the fingerprint recognition sensor 100 includes the substrate 130, the base layer 114 of the backlight unit 110 positioned on one surface of the substrate 130, and the cover layer 180 opposite to and spaced apart from the other surface of the substrate 130.

On the other surface of the substrate 130, the sensor pixels 160 are defined at the areas where the multiple scan lines SL1 to SLn and the multiple sensor data readout lines DL1 to DLm cross each other. Each sensor pixel 160 includes the photo sensor PS and the thin film transistor TFT.

The thin film transistor TFT may include a channel layer 132, a gate electrode 136, a source electrode 140, and a drain electrode 142.

A gate insulating layer 134 is positioned between the channel layer 132 and the gate electrode 136 and a first insulating layer 138 is positioned on the gate electrode 136. The source electrode 140 and the drain electrode 142 are positioned on the first insulating layer 138 and each of the source electrode 140 and the drain electrode 142 contacts the channel layer 132 through a contact hole.

However, the thin film transistor TFT illustrated in FIG. 9 is exemplified for easy description and is not limited thereto and may be designed in various structures. The channel layer 132 may include low-temperature polycrystalline silicon LTPS, amorphous silicon a-Si, or oxide.

The thin film transistor TFT may have, for example, one structure of a co-planar structure, a staggered structure, an inverted co-planar structure, and an inverted staggered structure.

The photo sensor PS includes a first electrode 144 formed by extending the drain electrode 142 of the thin film transistor TFT, a semiconductor layer 146 positioned on the first electrode 144, and a second electrode 148 including the transparent material and positioned on the semiconductor layer 146. A second insulating layer 150 is positioned on the photo sensor PS and a bias electrode 152 is connected with the second electrode 148 through the contact hole. Herein, the first electrode 144 and the second electrode 148 may form the capacitor.

Herein, the semiconductor layer 146 of the photo sensor PS may include, for example, the amorphous silicon a-Si, an organic material, or a quantum dot.

A planarization layer 154 may be positioned on the second insulating layer 150 and the bias electrode 152. The planarization layer 154 may protect the thin film transistor TFT and the photo sensor PS therebelow and planarize elements on the cover layer 180.

A first optical adhesive layer 178 may be positioned between the cover layer 180 and the planarization layer 154 and a second optical adhesive layer 128 may be positioned between the substrate 130 and the base layer 114. The first optical adhesive layer 178 may have the same refractive index as the cover layer 180 and include the transparent material and the second optical adhesive layer 128 may have the same refractive index as the substrate 130 and the transparent material.

When light $\theta_{91}$ and $\theta_{92}$ irradiated at an angle larger than the critical angle to cause total reflection on the surface contacting the fingerprint 190 is reflected on the fingerprint 190 in the cover layer 180, the photo sensor PS may sense the reflected light. In the fingerprint recognition sensor 100 according to the exemplary embodiments, all light (for example, equal to or more than 30° and less than 90°) having the incident angle larger than the critical angle in the cover layer 180 may be used for the fingerprint recognition. Accordingly, the light use efficiency may be enhanced and the reliability of the fingerprint recognition may be enhanced even in media other than the air.

The fingerprint recognition sensor 100 may have a structure in which the substrate 130 is omitted in the exemplary embodiments described in parts associated with FIGS. 2 to 9.

For example, the fingerprint recognition sensor 100 includes the backlight unit 110 including the base layer 114 and the light source 112 on one side of the base layer 114 and the cover layer 180 spaced apart from the base layer 114 and facing the base layer 114. Further, the fingerprint recognition sensor 100 includes multiple sensor pixels 160 defined in multiple scan lines SL1 to SLn and multiple data readout lines DL1 to DLm on the base layer 114 and positioned between the base layer 114 and the cover layer 180, and multiple photo sensors PS positioned in the respective sensor pixels 160 and sensing light transmitted on the base layer 114 toward the cover layer 180 and totally reflected on the surface contacting a fingerprint 190 of a user on the cover layer 180. In this case, light in which the incident angle on the surface 115a facing the cover layer 180 in the base layer 114 is larger than the critical angle in the light irradiated from the light source 112 may be transmitted toward the cover layer 180.

Herein, the base layer 114 of the backlight unit 110 may simultaneously function even as the substrate. Accordingly, the thickness of the fingerprint recognition sensor 100 may be further reduced.

Figure 10A:
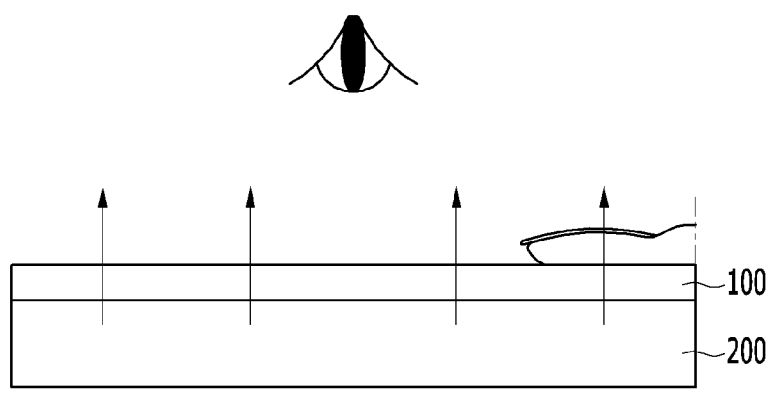
FIG. 10A is a schematic view illustrating a form in which the fingerprint recognition sensor is coupled onto a whole surface of an external device.
Figure 10B:
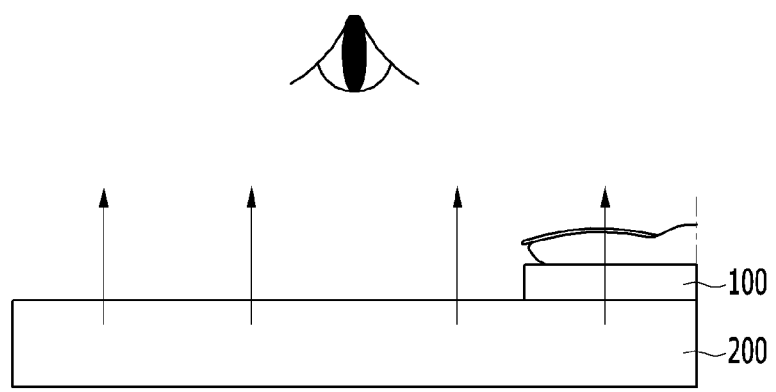
FIG. 10B is a schematic view illustrating a form in which the fingerprint recognition sensor is coupled onto a partial surface of the external device.

FIG. 10A is a schematic view illustrating a shape in which the fingerprint recognition sensor is coupled onto the front surface of an external device according to an exemplary embodiment and FIG. 10B is a schematic view illustrating a shape in which the fingerprint recognition sensor is coupled onto a partial surface of the external device according to an exemplary embodiment.

All of the base layer 114, the substrate 130, the cover layer 180, and the optical adhesive layers 128 and 178 of the fingerprint recognition sensor 100 according to the exemplary embodiments may be made of the transparent material and may have the same or similar refractive index. Further, the light source of the fingerprint recognition sensor 100 may exist on the side and the prism or the reflection plate below the fingerprint recognition sensor 100 used in the related art may not be included.

Accordingly, the transparency may be significantly enhanced as compared with the fingerprint recognition sensor in the related art, and as a result, even though the fingerprint recognition sensor is coupled with an external device 200 such as the display panel, the fingerprint recognition sensor may not almost influence a function of the external device (see FIGS. 10A and 10B). Accordingly, a coupling property with the external device 200 may be significantly enhanced.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A fingerprint recognition sensor comprising:
a substrate;
a backlight unit including a base layer positioned on one surface of the substrate and including a transparent material, and a light source irradiating light to the inside of the base layer on one side of the base layer, in which light of which an incident angle on a surface facing the substrate is larger than a critical angle in the light irradiated from the light source is transmitted toward the substrate;
a cover layer spaced apart from the substrate and facing the other surface of the substrate;

multiple sensor pixels defined by multiple scan lines and multiple data readout lines on the other surface of the substrate and positioned between the substrate and the cover layer; and
multiple photo sensors positioned in the respective sensor pixels and sensing the light transmitted from the base layer toward the substrate and total-reflected on a surface contacting a fingerprint of a user on the cover layer,
wherein:
the base layer is formed to be larger than the substrate, and
the base layer includes a light transmission unit overlapped with the substrate, and a light guide unit not overlapped with the substrate and positioned between the light source and the light transmission unit, and
in the light guide unit, light of which an angle between the light and a normal of the interface between the light guide unit and the external material is larger than the critical angle in the light irradiated from the light source is guided to the light transmission unit and light of which an angle between the light and a normal of the interface between the light guide unit and the external material is smaller than the critical angle in the light irradiated from the light source is not guided to the light transmission unit.

2. The fingerprint recognition sensor of claim 1, wherein:
the base layer includes a first surface facing the substrate and a second surface which is an opposite surface to the first surface, and
at least a part of the second surface has a shape to be inclined toward the first surface while being distant from the light source.

3. The fingerprint recognition sensor of claim 2, wherein:
the second surface of the base layer includes two or more protrusions having a shape to be inclined toward the first surface while being distant from the light source.

4. The fingerprint recognition sensor of claim 1, wherein:
the base layer includes a first surface facing the substrate and a second surface which is an opposite surface to the first surface, and
at least a part of the second surface has a shape to be inclined to be distant from the first surface while being distant from the light source.

5. The fingerprint recognition sensor of claim 1, wherein:
the base layer includes a first surface facing the substrate and a second surface which is an opposite surface to the first surface, and
at least a part of the first surface of the light guide unit has a shape to be inclined to be distant from the second surface while being distant from the light source.

6. The fingerprint recognition sensor of claim 1, wherein:
a refractive index of the cover layer is larger than 1.0 and equal to or less than 2.0.

7. The fingerprint recognition sensor of claim 6, wherein:
the critical angle is equal to or more than 30° and less than 90°.

8. The fingerprint recognition sensor of claim 1, further comprising:
a first optical adhesive layer positioned between the photo sensor and the cover layer, including the transparent material, and having a refractive index which is the same as the refractive index of the cover layer.

9. The fingerprint recognition sensor of claim 8, further comprising:

a second optical adhesive layer positioned between the substrate and the base layer, including the transparent material, and having the same refractive index with the substrate.

10. The fingerprint recognition sensor of claim 1, further comprising:
multiple thin film transistors connected to the multiple scan lines and the multiple data readout lines, and transmitting a current signal depending on resistance variation of each photo sensor to the multiple data readout lines,
wherein each photo sensor includes a first electrode formed by extending the drain electrode of the thin film transistor, a semiconductor layer positioned on the first electrode, and a second electrode including the transparent material and positioned on the semiconductor layer, and
wherein the first electrode and the second electrode form a capacitor.

11. The fingerprint recognition sensor of claim 10, further comprising:
a scan line driver driving the multiple scan lines; and a readout controller supplying the current signal of each photo sensor to a readout driver through the data readout lines.

12. The fingerprint recognition sensor of claim 10, wherein:
the thin film transistor has one structure of a co-planar structure, a staggered structure, an inverted co-planar structure, and an inverted staggered structure.

13. The fingerprint recognition sensor of claim 10, wherein:
a channel layer of the thin film transistor includes a low-temperature polycrystalline silicon(LTPS), an amorphous silicon(a-Si), or an oxide.

14. The fingerprint recognition sensor of claim 10, wherein:
a semiconductor layer of the photo sensor includes an amorphous silicon(a-Si), an organic material, or a quantum dot.

15. A fingerprint recognition sensor comprising:
a backlight unit including a base layer and a light source irradiating light to the inside of the base layer on one side of the base layer;
a cover layer spaced apart from the base layer and facing the base layer;
multiple sensor pixels defined by multiple scan lines and multiple data readout lines on the base layer and positioned between the base layer and the cover layer; and
multiple photo sensors positioned in the respective sensor pixels and sensing light transmitted from the base layer toward the cover layer and total-reflected on a surface contacting a fingerprint of a user on the cover layer,
wherein, in the backlight unit, light of which an incident angle on a surface facing the cover layer in the base layer is larger than a critical angle in the light irradiated from the light source is transmitted toward the cover layer and light of which an incident angle on a surface facing the cover layer in the base layer is smaller than a critical angle in the light irradiated from the light source is not transmitted toward the cover layer.

16. A fingerprint recognition sensor comprising:
a substrate;
a backlight unit including a base layer positioned on one surface of the substrate and including a transparent material, and a light source irradiating light to the inside of the base layer on one side of the base layer, in which light of which an incident angle on a surface facing the substrate is larger than a critical angle in the light irradiated from the light source is transmitted toward the substrate;
a cover layer spaced apart from the substrate and facing the other surface of the substrate;
multiple sensor pixels defined by multiple scan lines and multiple data readout lines on the other surface of the substrate and positioned between the substrate and the cover layer; and
multiple photo sensors positioned in the respective sensor pixels and sensing the light transmitted from the base layer toward the substrate and total-reflected on a surface contacting a fingerprint of a user on the cover layer,
wherein:
the backlight unit further includes a light direction switching member positioned between a front surface of the light source and a lateral surface of the base layer, and
the light direction switching member deflects light irradiated from the light source so that the incident angle on the surface facing the substrate in the base layer is larger than the critical angle.

17. The fingerprint recognition sensor of claim 16, wherein:
the light direction switching member includes a lens, a prism, or a mirror.

* * * * *